(12) United States Patent
Ohsawa et al.

(10) Patent No.: US 10,471,885 B2
(45) Date of Patent: Nov. 12, 2019

(54) HEADLIGHT OPTICAL AXIS CONTROL APPARATUS

(71) Applicant: MITSUBISHI ELECTRIC CORPORATION, Tokyo (JP)

(72) Inventors: Takashi Ohsawa, Tokyo (JP); Wataru Tsujita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 159 days.

(21) Appl. No.: 15/533,145

(22) PCT Filed: Mar. 12, 2015

(86) PCT No.: PCT/JP2015/057331
§ 371 (c)(1),
(2) Date: Jun. 5, 2017

(87) PCT Pub. No.: WO2016/143124
PCT Pub. Date: Sep. 15, 2016

(65) Prior Publication Data
US 2018/0257540 A1  Sep. 13, 2018

(51) Int. Cl.
*B60Q 1/08* (2006.01)
*B60Q 1/115* (2006.01)

(52) U.S. Cl.
CPC ........ *B60Q 1/115* (2013.01); *B60Q 2300/114* (2013.01); *B60Q 2300/132* (2013.01); *B60Q 2300/324* (2013.01)

(58) Field of Classification Search
CPC .... B60Q 1/115; B60Q 1/10; B60Q 2300/114; B60Q 2300/116; B60Q 2300/13; B60Q 2300/132; B60Q 2300/32; B60Q 2300/324; B60Q 2300/00; B60Q 2300/14; B60Q 1/08; F21V 23/0442; G01M 11/062
See application file for complete search history.

(56) References Cited

U.S. PATENT DOCUMENTS

| | | | |
|---|---|---|---|
| 2012/0101692 A1 | 4/2012 | Kasaba et al. | |
| 2012/0268958 A1 | 10/2012 | Kasaba et al. | |
| 2017/0129390 A1 | 5/2017 | Akaza et al. | |
| 2017/0151902 A1* | 6/2017 | Watano | B60Q 1/10 |

FOREIGN PATENT DOCUMENTS

| | | |
|---|---|---|
| JP | 2012-106719 A | 6/2012 |
| JP | 2012-228891 A | 11/2012 |
| JP | 2013-35511 A | 2/2013 |
| JP | 2014-88156 A | 5/2014 |
| JP | 2014-104788 A | 6/2014 |

* cited by examiner

Primary Examiner — Y M. Lee
(74) Attorney, Agent, or Firm — Birch, Stewart, Kolasch & Birch, LLP

(57) ABSTRACT

A headlight optical axis control apparatus calculates an inclination angle of a vehicle with respect to a road surface from a ratio of a difference between acceleration signals in the front-and-rear direction measured at two time points (kn, kn+1) to a difference between acceleration signals in the up-and-down direction measured at the two time points (kn, kn+1), the two time points being in the vicinity of a time when the attitude of a vehicle body becomes equivalent to a stationary state, in a period from a time when the travelling vehicle stops to a time when the vehicle body comes to a halt.

6 Claims, 10 Drawing Sheets

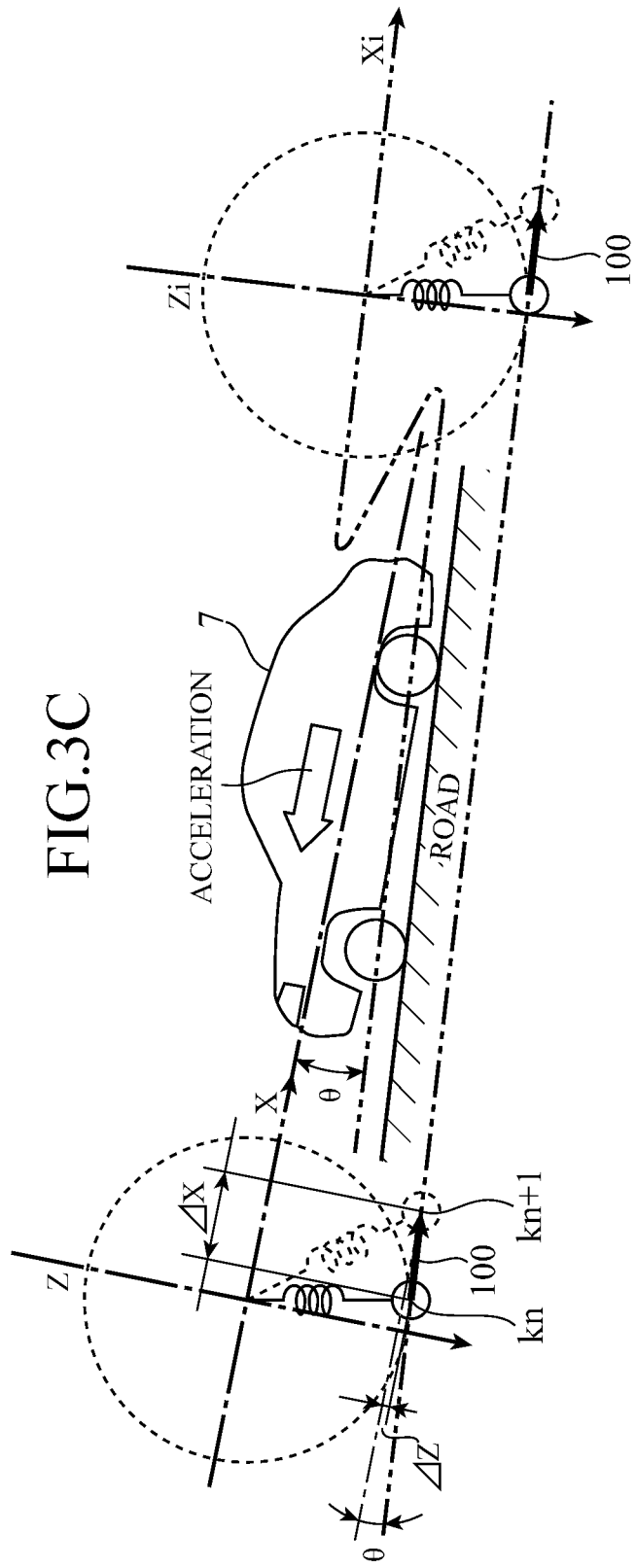

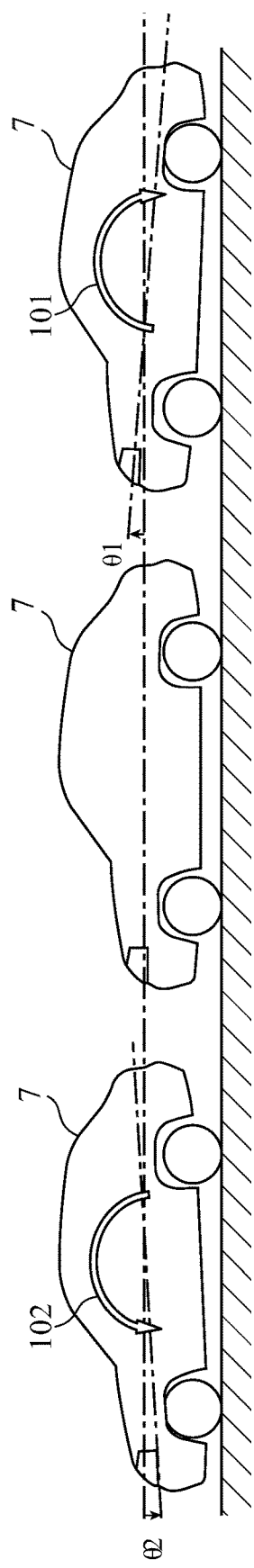

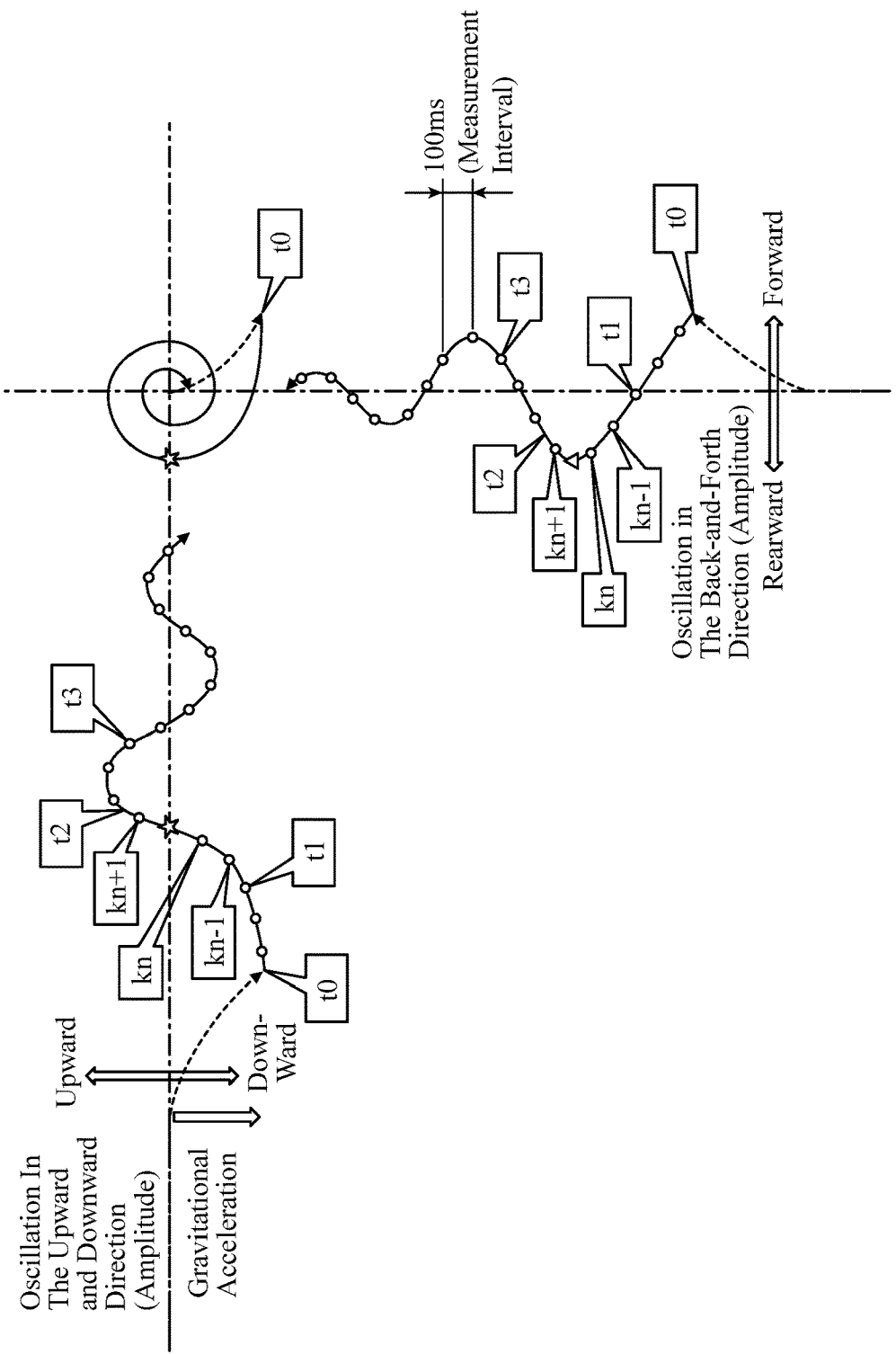

HEADLIGHT OPTICAL AXIS CONTROL APPARATUS

TECHNICAL FIELD

The present invention relates to a headlight optical axis control apparatus for controlling an optical axis of a headlight mounted on a vehicle based on acceleration signals measured by an acceleration sensor.

BACKGROUND ART

In a headlight mounted on a vehicle, a bright discharge lamp or an LED (light emitting diode) for brightly lighting in any direction, in place of a conventional halogen bulb as a light source, is widely used to enhance safety during night driving, while having high design qualities and an upscale image.

In mounting the aforementioned bright light source on the vehicle, when a rear portion of the vehicle is lowered and inclined, in other words, when a front portion of the vehicle is raised and the light emitting direction of headlights is inclined upward due to, for example, the presence of a person who takes a rear seat of the vehicle or baggage loaded in a trunk, it is necessary to lower the light emitting direction of the headlights, that is, the optical axes of the headlights and keep constant the optical axes with respect to a road surface so as not to dazzle a driver in an oncoming vehicle, and so as not to give an unpleasant feeling to pedestrians facing the headlights. To put it briefly, as for the vehicle having the bright light source, it is essential to mount a headlight optical axis control apparatus which lowers the light emitting direction of the headlights and returns the light emitting direction of the headlights to a direction prior to change when the vehicle is inclined and the light emitting direction of the headlights is varied upward due to at least the presence of a person who rides on the vehicle or the baggage loaded in the trunk.

Note that a person rides on a vehicle or the baggage is loaded on the vehicle during stoppage of the vehicle, and optical axis control during stoppage of the vehicle is main control performed by the headlight optical axis control apparatus.

Incidentally, the control of the headlight optical axis is one wherein the optical axis is operated up and down, in such a way as to cancel a change in an inclination angle (hereinafter referred to as "vehicle angle") of the vehicle with respect to the road surface in order to return the light emitting direction of the headlights to an original direction when the vehicle is inclined in an up-and-down direction as described above, so that, first, it is necessary to measure the vehicle angle.

Conventionally, the shrinking amounts of front and rear suspensions of a vehicle, i.e., the sinking amounts of front and rear axle portions have been measured by using stroke sensors mounted on the front and rear suspensions (suspension devices) of the vehicle, and the vehicle angle has been calculated on the basis of a difference between the sinking amounts of the front and rear axle portions and a length of a wheel base.

In recent years, instead of a configuration using the stroke sensors mounted on the suspensions, a configuration using an acceleration sensor that can detect gravitational acceleration has been studied as disclosed in, for example, Patent Literature 1. In the configuration using the acceleration sensor, it is easy to detect a change in the inclination angle of a vehicle that is being stopped, and it is easy to obtain the vehicle angle at the present time by accumulating variation amounts caused by the boarding or alighting of persons with respect to an initial vehicle angle. On the other hand, an offset, which varies with time, is included in output of the acceleration sensor, and the vehicle angle obtained by accumulating the variation amounts potentially includes a cumulative error, so that there is a problem that the accuracy of the vehicle angle obtained by accumulating measured values and the change is low. Accordingly, in order to maintain the headlight optical axis stably at a correct angle for a long period of time, it is necessary to ensure the accuracy of the vehicle angle by adding some correction to the acceleration measured by the acceleration sensor or removing the cumulative error from the vehicle angle.

An optical axis control apparatus disclosed in Patent Literature 1 enhances the accuracy of the vehicle angle while using an acceleration sensor in two axes in the front-and-rear direction and up-and-down direction of the vehicle, and the optical axis control apparatus measures the acceleration and performs the optical axis control during the travelling of the vehicle, in order to perform preferable headlight optical axis control, besides the optical axis control during the stoppage of the vehicle. By using the acceleration measured during the travelling of the vehicle, the optical axis control apparatus disclosed in Patent Literature 1 obtains a changing direction of the acceleration at each time or obtains a changing direction of the acceleration on the basis of two acceleration measured at different measuring timing, calculates the vehicle angle, and controls the optical axis on the basis of a change in the vehicle angle.

CITATION LIST

Patent Literature

Patent Literature 1: Japanese Unexamined Patent Application Publication No. 2012-106719

SUMMARY OF INVENTION

Technical Problem

Regarding an actual vehicle, when it accelerates, inclination of the vehicle varies in such a way that a front portion of the vehicle is raised or that a rear portion of the vehicle is lowered. When it decelerates, the inclination of the vehicle varies in such a way that the front portion of the vehicle is lowered or that the rear portion of the vehicle is raised. Therefore, an acceleration change direction during the acceleration or deceleration is not a straight line.

However, in Patent Literature 1, even when the vehicle accelerates or decelerates, it is assumed that the vehicle angle does not vary and the acceleration variation direction during the acceleration or deceleration is obtained by using linear approximation as shown in FIGS. 4 and 6 in Patent Literature 1. That is, in Patent Literature 1, that which the inclination angle varies due to the acceleration or deceleration of the vehicle is not considered, and there is a problem in that the vehicle angle cannot be obtained with high accuracy.

The present invention is made in order to solve the above-mentioned problem, and it is therefore an object of the present invention to obtain a vehicle angle with high accuracy in which an error of the inclination angle caused by the acceleration or deceleration of a vehicle is not included.

Solution to Problem

A headlight optical axis control apparatus according to the present invention includes a controller which calculates an inclination angle (vehicle angle) of a vehicle with respect to a road surface on a basis of acceleration signals in an up-and-down direction and in a front-and-rear direction, measured by an acceleration sensor mounted on the vehicle and which generates control signals to operate a headlight optical axis, wherein the controller calculates the inclination angle of the vehicle with respect to the road surface from a ratio of a difference between the acceleration signals in the up-and-down direction measured at two time points to a difference between the acceleration signals in the front-and-rear direction measured at the two time points, the two time points being selected from a period ranging from a time immediately before attitude of a vehicle body is identical to a stationary state to a time immediately after the attitude of the vehicle body is identical to the stationary state, from a time when the travelling vehicle stops to a time when the vehicle body comes to a halt.

Advantageous Effects of Invention

According to the present invention, the headlight optical axis control apparatus calculates the vehicle angle from the ratio of the difference between the signals of acceleration in the front-and-rear direction, measured at two time points during time, which ranges from the time immediately before the attitude of the vehicle body corresponds to a stationary state and the time immediately after the attitude of the vehicle body corresponds to a stationary state, in the period between the time when the travelling vehicle stops and the time when the vehicle body comes to a halt, to the difference between the signals of acceleration in the up-and-down direction, measured at the two time points, so that the vehicle angle in which an error of inclination angle caused by acceleration or deceleration of the vehicle is not included can be obtained with high accuracy.

BRIEF DESCRIPTION OF DRAWINGS

FIGS. 3A to 3C are diagrams to describe a relationship between acceleration and a vehicle angle in Embodiment 1;

FIGS. 4A to 4C are diagrams to describe the inclination of the vehicle which varies due to acceleration or deceleration;

FIG. 6 is a graph for illustrating the vibration of the vehicle body when a travelling vehicle stops and leads to a stationary state;

DESCRIPTION OF EMBODIMENTS

Hereinafter, embodiments of the present invention will be described in detail with reference to attached drawings to describe the present invention in more details.

Embodiment 1

Figure 1:
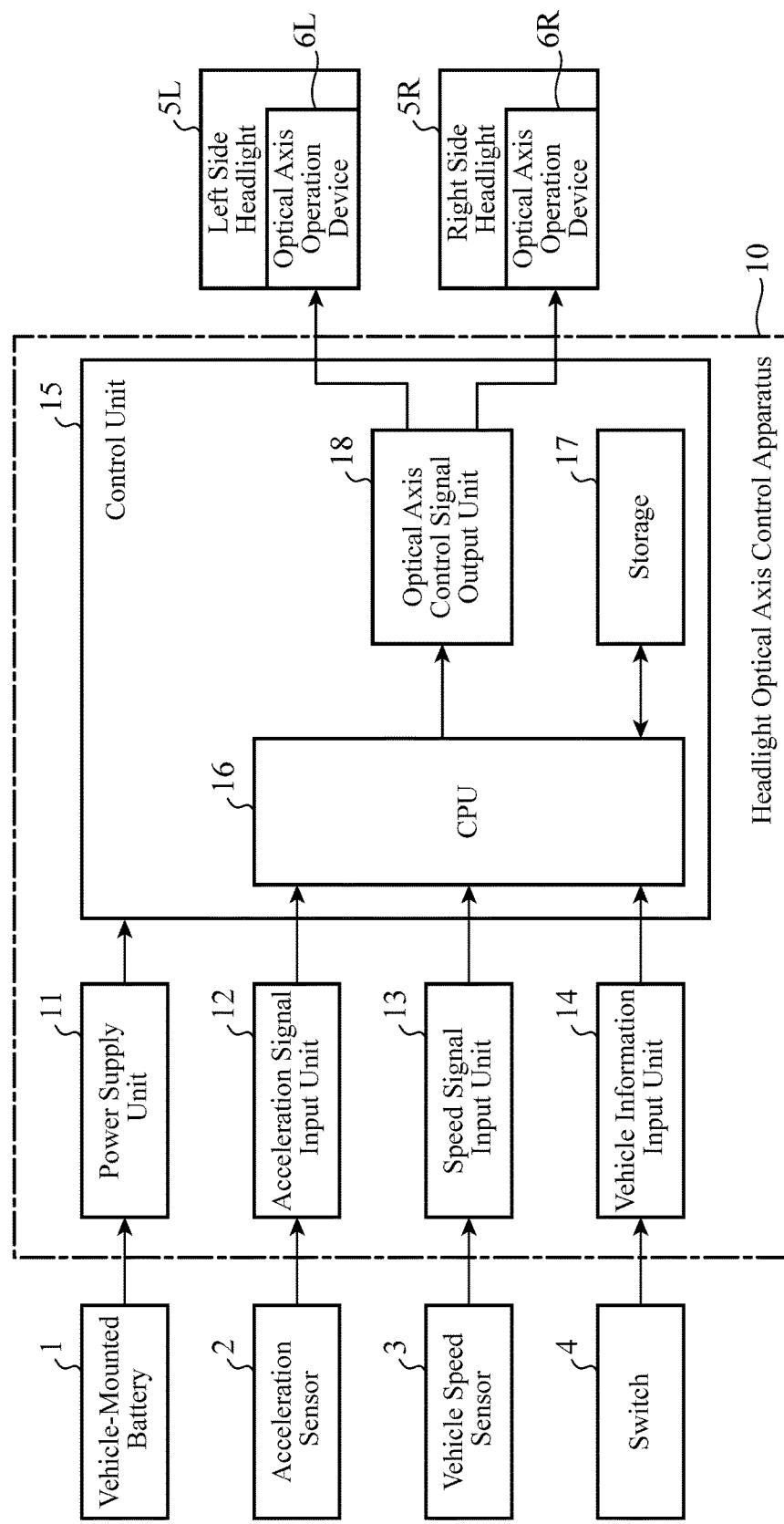
FIG. 1 is a block diagram for illustrating a configuration example of a headlight optical axis control apparatus according to Embodiment 1 of the present invention.

FIG. 1 is a block diagram for illustrating a configuration example of a headlight optical axis control apparatus 10 according to Embodiment 1. The headlight optical axis control apparatus 10 according to Embodiment 1 includes a power supply unit 11, an acceleration signal input unit 12, a speed signal input unit 13, a vehicle information input unit 14, and a control unit 15. The control unit 15 includes a CPU (Central Processing Unit) 16, a storage 17 constituted by a semiconductor memory and the like, and an optical axis operation signal output unit 18.

Figure 2A:
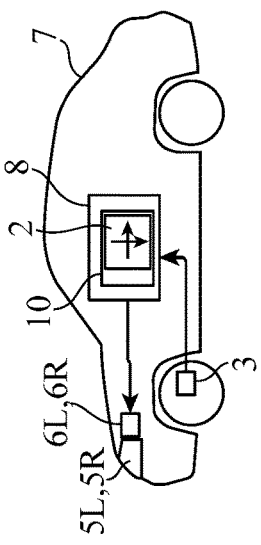
FIGS. 2A to 2C are diagrams for illustrating the examples of mounting the headlight optical axis control apparatus according to Embodiment 1 on a vehicle.
Figure 2B:
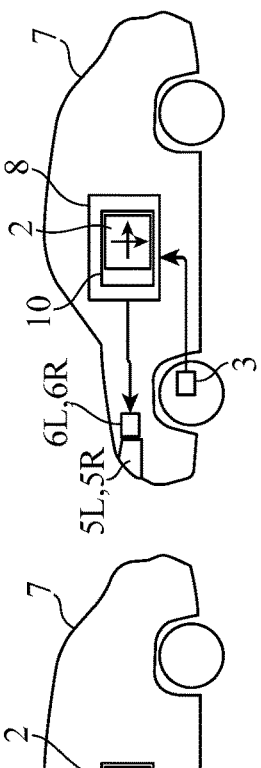
Figure 2C:
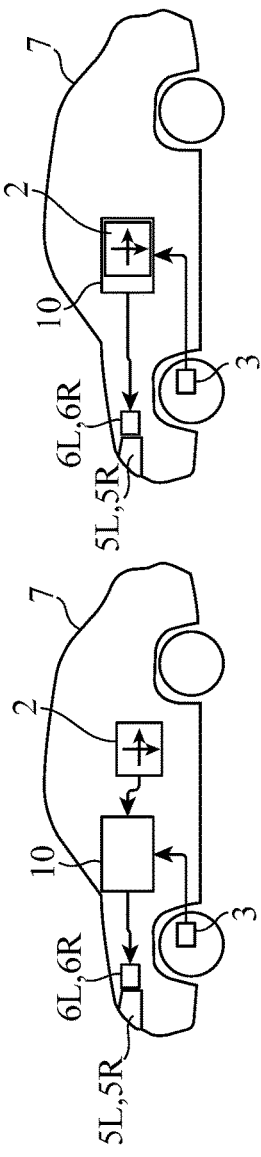

FIGS. 2A to 2C are diagrams for illustrating the examples of mounting the headlight optical axis control apparatus 10 on a vehicle 7. The vehicle 7 includes a left side headlight 5L including an optical axis operation device 6L for adjusting the direction of an optical axis, a right side headlight 5R including an optical axis operation device 6R for adjusting the direction of an optical axis, an acceleration sensor 2, a vehicle speed sensor 3, and the headlight optical axis control apparatus 10. The acceleration sensor 2 measures acceleration applied to the vehicle 7 in the front-and-rear direction and acceleration applied to the vehicle 7 in the up-and-down direction and outputs acceleration signals. The vehicle speed sensor 3 measures a speed of the vehicle 7 and outputs speed signals.

In the example illustrated in FIG. 2A, the headlight optical axis control apparatus 10 and the acceleration sensor 2 are separately constituted. In the example illustrated in FIG. 2B, the acceleration sensor 2 is stored in the interior of the headlight optical axis control apparatus 10 and integrally constituted. In the example illustrated in FIG. 2C, the headlight optical axis control apparatus 10 integrated with the acceleration sensor 2 is stored in the interior of other vehicle-mounted electrical equipment 8.

The headlight optical axis control apparatus 10 keeps the optical axes constant in the up-and-down direction of the right and left headlights 5L, 5R illuminating the front of the vehicle 7.

The power supply unit 11 supplies the power of a vehicle-mounted battery 1 to the control unit 15. The acceleration signal input unit 12, the speed signal input unit 13, and the vehicle information input unit 14 are communication devices and communicate with vehicle-side devices such as the acceleration sensor 2, the vehicle speed sensor 3, and a switch 4 via a vehicle communication network such as CAN (Controller Area Network). The acceleration signal input unit 12 inputs the signals regarding acceleration in the front-and-rear direction and the up-and-down direction, which are outputted from the acceleration sensor 2, to the CPU 16. The speed signal input unit 13 inputs the speed signals, which are outputted from the vehicle speed sensor 3, to the CPU 16. The vehicle information input unit 14 inputs vehicle information, which indicates the content of an operation performed by a driver with respect to the switch 4 of the vehicle 7 that is constituted of an ignition switch, a lighting switch, a dimmer switch, to the CPU 16.

The CPU 16 uses the signals regarding acceleration in the front-and-rear direction and the up-and-down direction and the speed signals, calculates an inclination angle (vehicle angle) of the vehicle 7 with respect to the road surface, and generates optical axis operation signals for canceling change in the vehicle angle. The optical axis operation signal output unit 18 outputs the optical axis operation signals, which are calculated by the CPU 16, to the optical axis operation devices 6L, 6R.

The optical axis operation devices 6L, 6R performs optical axis control in such a manner as to cancel the variation in the vehicle angle of the vehicle 7 by operating the angles of the optical axes of the headlights 5L, 5R in response to the optical axis operation signals inputted from the headlight optical axis control apparatus 10. Accordingly, the optical axis of the headlight with respect to the road surface is kept constant even when the vehicle angle of the vehicle 7 is varied.

FIGS. 3A to 3C are diagrams to describe a relationship between acceleration and a vehicle angle.

In the description of the present invention, an acceleration measurement system in which a Z-axis represents the up-and-down direction of the vehicle 7, and an X-axis represents the front-and-rear direction of the vehicle 7 is used. As shown in FIG. 3A, a direction and magnitude of acceleration applied to the vehicle 7 in the acceleration measurement system are represented by the position of a weight suspended from a spring.

If it is assume that a planar rectangle whose four vertices correspond to the center points of the respective front-and-rear and right-and-left wheels in contact with the road surface is regarded as an imaginary truck, the plane of the imaginary truck is parallel to the road surface, and an angle $\theta$ formed by the imaginary truck and a vehicle body that is supported by suspension (suspension device) corresponds to the vehicle angle. In view of the above-mentioned description, in FIG. 3B, acceleration applied to the imaginary truck of the vehicle 7, that is, acceleration applied to the acceleration measurement system equivalent to one viewed from a road side is represented by the behavior of the weight suspended from the spring. Note that, in this diagram, a Zi-axis represents the up-and-down direction of the imaginary truck, and an Xi-axis represents the front-and-rear direction of the imaginary truck.

As shown in FIG. 3B, when the vehicle 7 accelerates, the weight is moved parallel to the road surface even on a flat or slope. In one view, the weight is moved in the direction of the Xi-axis of the imaginary truck. That is, change in acceleration attributed to the traveling of the vehicle is parallel to the road surface, i.e., represented by an arrow 100 in the direction of the Xi-axis of the imaginary truck.

In contrast, as shown in FIG. 3A, in the case in which the acceleration applied to the vehicle 7 is considered from the acceleration measurement system installed in the vehicle body supported by the suspension, the weight is also moved in the direction of the Xi-axis of the imaginary truck when the vehicle 7 accelerates, as described above, regardless of the direction of the X-axis, which is the front-and-rear direction of the acceleration measurement system.

By using the behavior of the weight, it is possible to detect the angle $\theta$ formed by the X-axis, which represents the front-and-rear direction of the acceleration measurement system, and the Xi-axis of the imaginary truck, i.e., the inclination angle (vehicle angle) of the vehicle 7 with respect to the road surface as the angle $\theta$ formed by the X-axis which represents the front-and-rear direction and the moving direction (arrow 100) of the weight due to the acceleration of the vehicle 7.

Therefore, as for the acceleration measurement system installed in the vehicle 7, when a moving amount (arrow 100) of the weight moving in parallel to the road surface is observed in a period from a time point kn to a time point kn+1 with a predetermined interval apart, that is, when variation amounts in acceleration in the front-and-rear direction and the up-and-down direction are observed, the vehicle angle can be calculated regardless of the rising and falling gradients of the road on which the vehicle is traveling.

However, when the actual vehicle 7 accelerates or decelerates, the vehicle 7 is inclined (pitching) back and forth. FIG. 4B is a diagram for illustrating the example of the vehicle 7 that stops while the vehicle body is in a stationary state. FIG. 4A is a diagram for illustrating the example of the vehicle 7 at the time of deceleration. FIG. 4C is a diagram for illustrating the example of the vehicle 7 at the time of acceleration.

When the vehicle 7 accelerates, the vehicle 7 is rotated by a rotation angle $\theta 1$ in a direction indicated by an arrow 101 as shown in FIG. 4C, and the vehicle 7 is inclined in such a way that a front portion of the vehicle 7 is raised or a rear portion of the vehicle 7 is lowered. Incidentally, that which the rear portion of the vehicle is lowered at the time of the acceleration of the vehicle 7 is referred to as "squat".

When the vehicle 7 decelerates, the vehicle 7 is rotated by a rotation angle $\theta 2$ in a direction indicated by an arrow 102 as shown in FIG. 4A, and the vehicle 7 is inclined in such a way that the front portion of the vehicle 7 is lowered or the rear portion of the vehicle 7 is raised. Incidentally, that which the front portion of the vehicle is lowered at the time of the deceleration of the vehicle 7 is referred to as "nose dive".

Thus, since the vehicle angle includes change in the inclination caused by the acceleration or deceleration of the vehicle 7, that is, an error of a pitch angle, the accuracy of the vehicle angle obtained by using acceleration at two unspecified time points, as seen in movements such as the squat and the nose dive, is low. Accordingly, in the headlight optical axis control, it is not appropriate to use the vehicle angle obtained by using the acceleration at two unspecified time points as it is.

Accordingly, in the present invention, the vehicle angle is calculated by using the acceleration at the time when the attitude of the vehicle body is estimated to be the same attitude as that of the vehicle body in the stationary state shown in FIG. 4B in a period from the time when the travelling vehicle 7 stops to the time when the vehicle body comes to a halt. Note that "when the vehicle stops" means a time when the rotation of the wheels of the vehicle is stopped.

FIGS. 5A to 5G are diagrams for illustrating the example of the behavior of the vehicle body during a period from the time when the travelling vehicle 7 stops to the time when the vehicle body comes to a halt. Note that the word "vehicle" is used when the behavior of the whole vehicle is represented, and the words "vehicle body" are used when the partial behavior of the vehicle is represented.

Figure 5A:
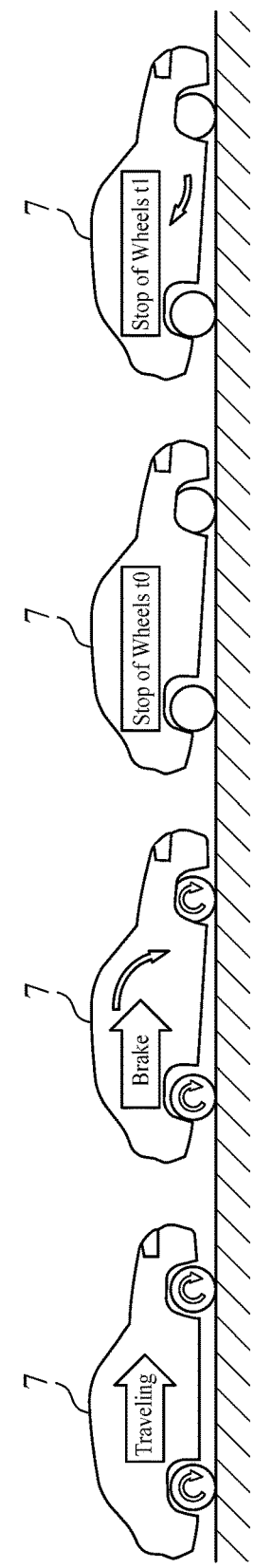
FIGS. 5A to 5G are diagrams for illustrating the behavior of a vehicle body when a travelling vehicle stops and leads to a stationary state.
Figure 5B:
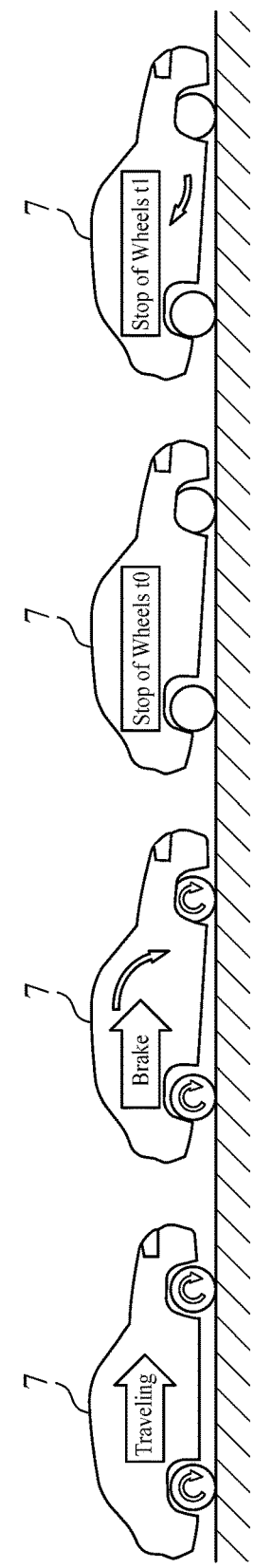
Figure 5C:
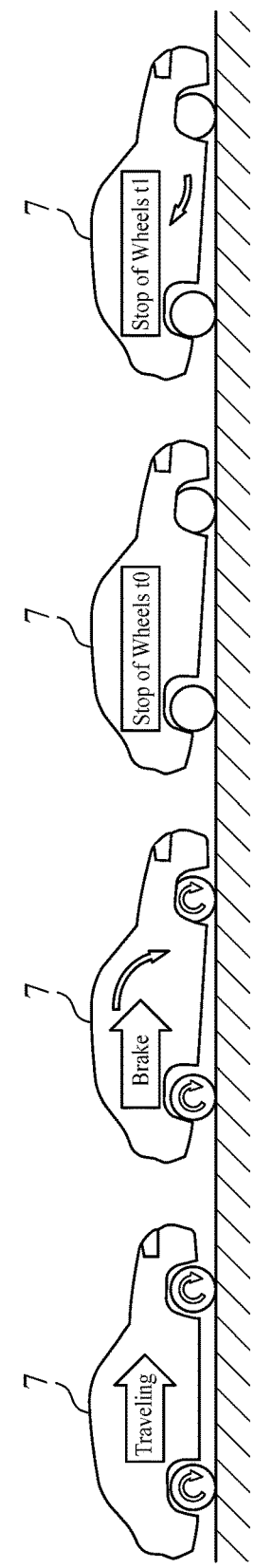

When the travelling vehicle 7 in FIG. 5A brakes, as shown in FIG. 5B, the vehicle 7 is in a nose-dive posture, and the springs and links of the suspension are bended, and the wheels stop rotating while the springs and links of the suspension store stress due to the bending. Therefore, a nose-dive amount of the vehicle 7 becomes the maximum at a time t0 when the vehicle stops, that is, when the wheels stop rotating, in the period from the time when the travelling vehicle 7 stops to the time when the vehicle body comes to a halt. FIG. 5C illustrates a state at the time t0 when the wheels stop rotating.

Figure 5D:
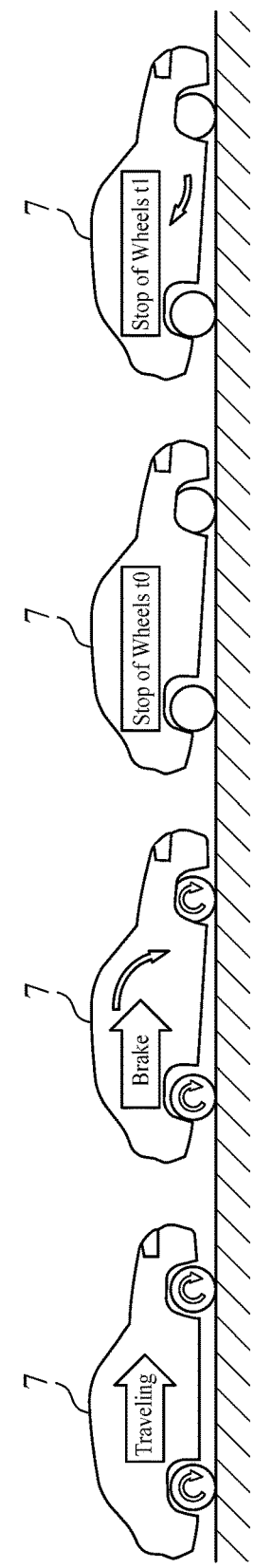
Figure 5E:
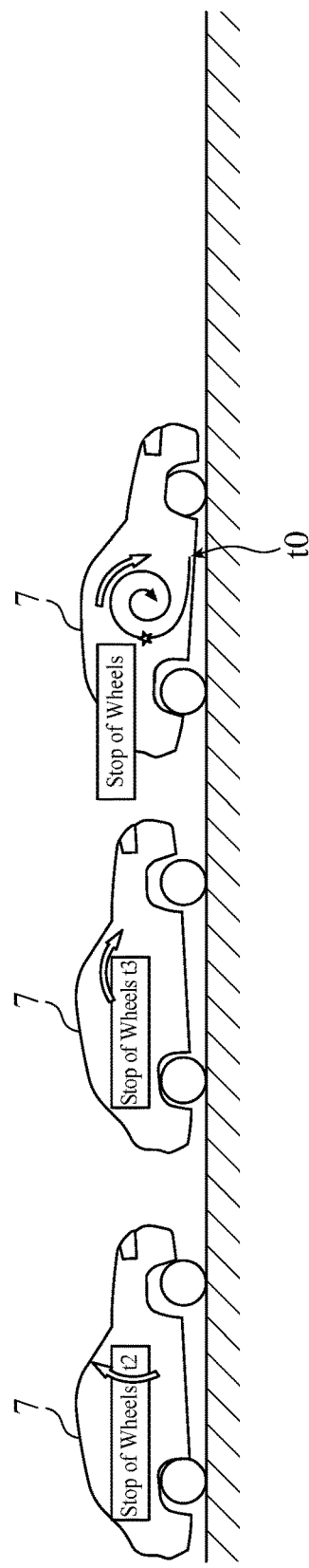
Figure 5F:
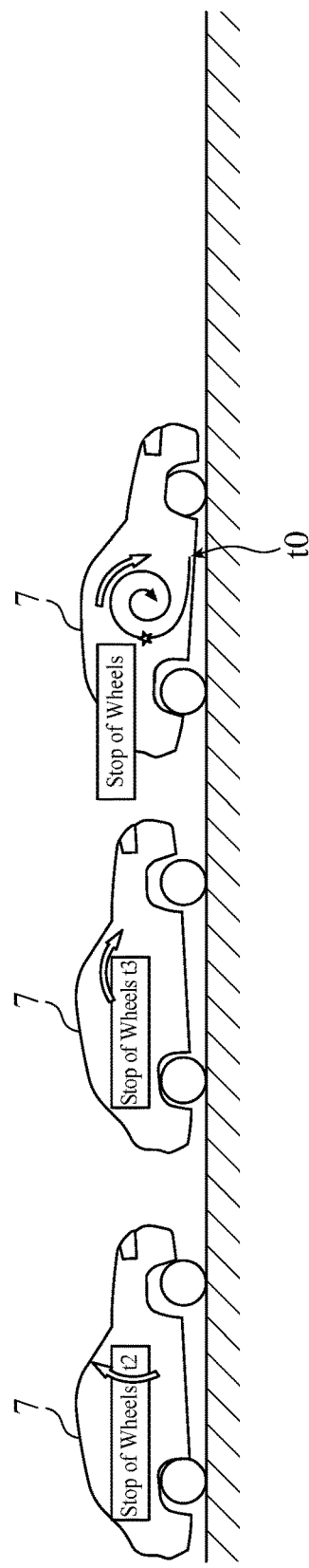
Figure 5G:
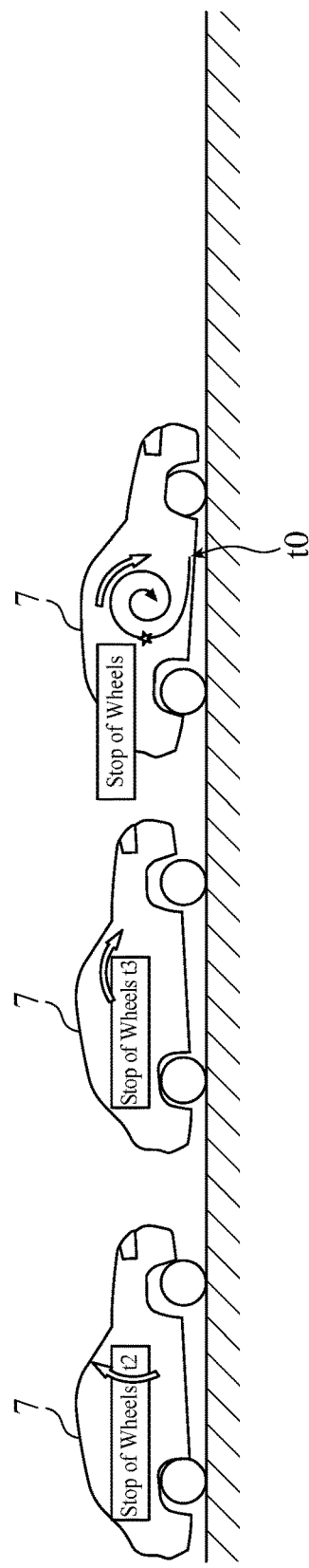

After the vehicle wheels stop rotating, the stress stored in the springs and links of the suspension due to the bending is released, and the vehicle body vibrates in the front-and-rear direction of the vehicle due to the stress stored in the links and vibrates in the up-and-down direction of the vehicle due to the stress stored in the springs of the suspension. FIGS. 5D to 5F illustrate the states of the vibration of the vehicle body as time goes (t0, t1, t2 . . . ). Note that t0, t1, t2 . . . represent elapsed time points during the vibration (for example, the vibration whose cycle is about one second) which is generated by the suspension, the links, and body weight. In FIG. 5G, a shifting locus of the vehicle body at the time point t0 onward when the wheels stop rotating is indicated by an arrow formed in a spiral shape. The vibrations of the vehicle in the front-and-rear direction and the up-and-down direction attenuate shortly, and the vehicle body falls in the stationary state shown in FIG. 4B.

FIG. 6 is a graph for illustrating an example of the vibration of the vehicle body in the period from the time when the travelling vehicle 7 stops to the time when the vehicle body comes to a halt. The horizontal axis of the graph represents the central position of the vibration of the vehicle body in the up-and-down direction of the vehicle, and the vertical axis of the graph represents the central position of the vibration of the vehicle body in the front-and-rear direction of the vehicle, and synthesized vibration composed of the vibrations in the up-and-down direction and the front-and-rear direction is indicated at an intersection of the two axes. A dashed line indicates the shifting locus of the vehicle body in the case where the vehicle brakes and the wheels stop rotating. A solid line indicates the locus of the vehicle body due to the vibration in the period from the time when the wheels stop rotating to the time when the vehicle body comes to a halt. Circles indicate the time points (kn−1, kn, kn+1 . . . ) at which the acceleration sensor 2 measures the acceleration, and for example, measurement intervals are 100 ms. An asterisk indicates the center of vibration amplitude in the up-and-down direction. A triangle indicates a point where the vibration amplitude in the front-and-rear direction is reversed.

In the case where the vehicle body vibrates in the up-and-down direction, when the center of the vibration amplitude indicated by the asterisk in FIG. 6 is passed, it is estimated that the vehicle body is positioned at the vehicle angle θ, which is identical to the stationary state. Accordingly, the vehicle angle θ in the center of the vibration amplitude in the up-and-down direction, which is brought by the vibration in the up-and-down direction that is attributed to the stop of the vehicle, does not include an error due to the pitch angle of the vehicle body.

Specifically, the aforementioned vehicle angle θ is calculated by the following equation (1):

$$\theta = \tan^{-1}(\Delta Z/\Delta X) \quad (1)$$

$$\Delta Z = Zkn+1 - Zkn$$

$$\Delta X = Xkn+1 - Xkn$$

In Embodiment 1, the acceleration in the Z-axis direction measured at the measurement time points kn, kn+1 in the vicinity of the time when the vehicle body passes through the center of vibration amplitude in the up-and-down direction is represented as Zkn, Zkn+1. The acceleration in the X-axis direction measured at the same measurement time points kn, kn+1 is represented as Xkn, Xkn+1.

Note that the two time points in a period ranging from a time immediately before the vehicle body passes through the center of the vibration amplitude in the up-and-down direction to a time immediately after the vehicle body passes through the center of the vibration amplitude in the up-and-down direction are two time points closest to the center of the vibration amplitude at the time immediately before the vehicle body passes through the center of the vibration amplitude or two time points closest to the center of the vibration amplitude at the time immediately after the vehicle body passes through the center of the vibration amplitude, more preferably, two time points with the center of the vibration amplitude sandwiched therebetween, at the times immediately before and after the vehicle body passes through the center of the vibration amplitude. In FIG. 6, measurement time points are preferably two time points kn, kn+1 with the center of the amplitude sandwiched therebetween, which is indicated by the asterisk.

Note that timing at which the vehicle body is positioned at vehicle angle θ equivalent to the stationary state may be not only the center of the vibration in the case where the vehicle body vibrates from below to above but also the center of the vibration in the case where the vehicle body vibrates from above to below.

As shown in FIG. 3, the vehicle angle θ at which the vehicle is traveling while accelerating is calculated in accordance with the above-mentioned equation (1) by using the acceleration in the Z-axis direction and the acceleration in the X-axis direction measured at the measurement time points kn, kn+1.

It should be noted that when the vehicle accelerates during travelling, the acceleration is varied not only on a level road but also on an upward or downward slope, in a direction parallel to the road surface as indicated by the arrow 100. That is, when the vehicle 7 is parallel to the road surface, i.e., the X-axis of the acceleration measurement system is parallel to the road surface, and when the acceleration is varied at the measurement time points kn, kn+1, the acceleration is varied in the direction parallel to the X-axis. In contrast, when the vehicle 7 is inclined at an angle of "θ degree" with respect to the road surface, i.e., the X-axis of the acceleration measurement system is inclined at the angle of "θ degree" with respect to the road surface, and when the acceleration is varied at the acceleration at the measurement time points kn, kn+1, the acceleration is varied in a direction inclined at the angle of "θ degree" with respect to the X-axis.

However, as mentioned above, in the actual vehicle 7, when the vehicle accelerates, the squat occurs, and when the vehicle decelerates, the nose dive occurs, so that pitching occurs in the vehicle 7, and "the vehicle angle θ identical to a stationary state" cannot be stably obtained by calculating the vehicle angle θ by use of the acceleration at two time points discriminately selected.

In contrast, in the present invention, the vehicle angle θ is calculated by using the acceleration at the measurement time points kn, kn+1 in a state of being "the vehicle angle θ identical to a stationary state" which exists in the vibration of the vehicle body in the up-and-down direction when the vehicle 7 stops, and therefore there is no influence of the pitch angle.

Noted that "the vehicle angle θ identical to a stationary state" is not limited to "the vehicle angle θ completely identical to a stationary state" in a strict sense, but may be "the vehicle angle θ equivalent to a stationary state" because there is a possibility that the vehicle angle is affected by the intervals of measuring the acceleration. Note that since the vehicle body vibrates not only in the up-and-down direction but also in the front-and-rear direction after the stop of the wheels, the vehicle angle θ can be calculated in accordance with the above-mentioned equation (1) in the same manner as when the vehicle is traveling.

Furthermore, in the present invention, since the variation amounts $\Delta Z$, $\Delta X$ of the acceleration are used to calculate the vehicle angle $\theta$, there is no influence of the offset existed in the output of the acceleration sensor 2, and there is no problem if the offset varies with time.

Next, the operation of the headlight optical axis control apparatus 10 will be described with reference to a flowchart in FIG. 7.

Figure 7:
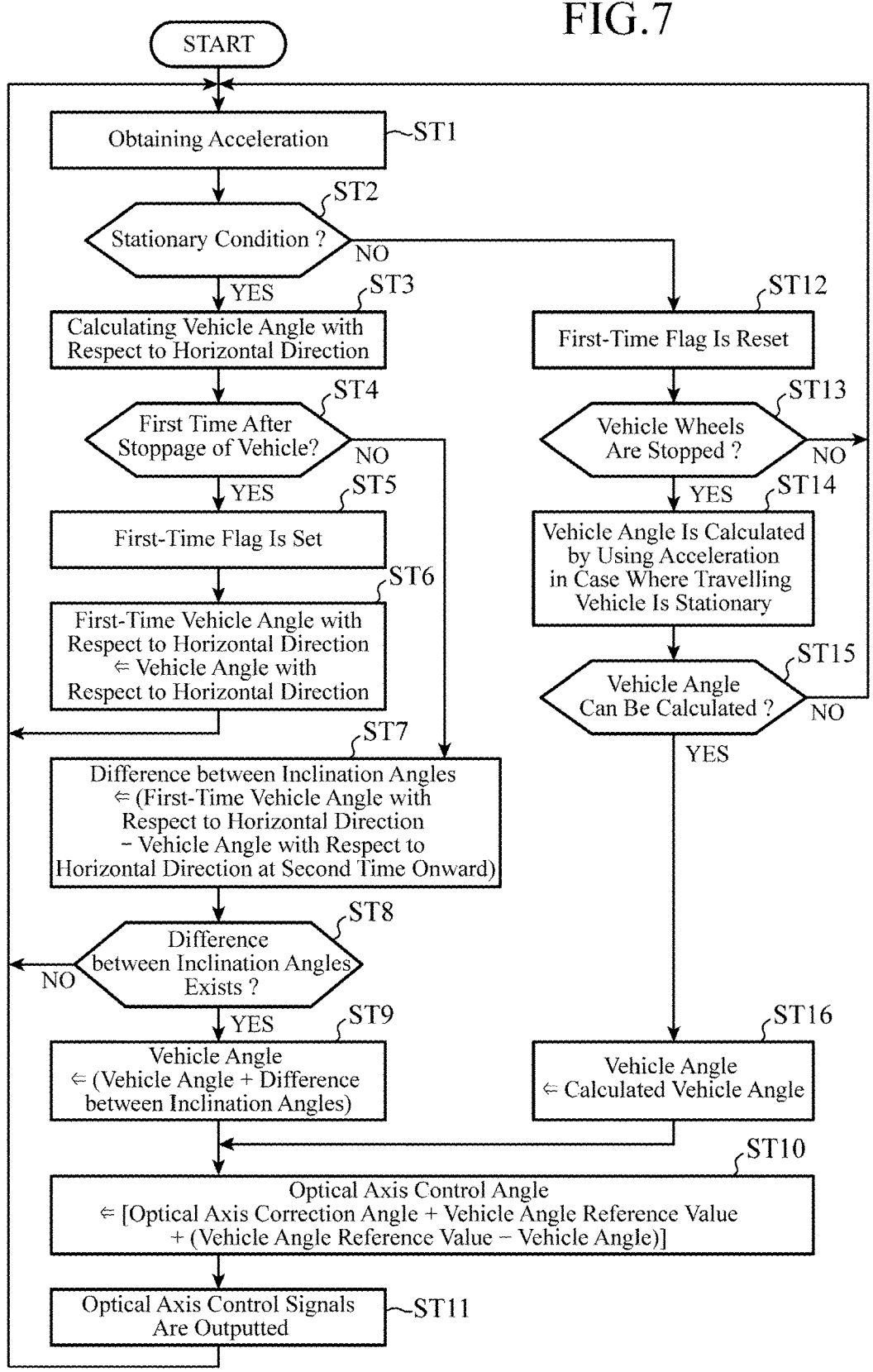
FIG. 7 is a flowchart for illustrating an operation of the headlight optical axis control apparatus according to Embodiment 1.

After the power supply is turned on, and the operation is started, the CPU 16 executes the flowchart in FIG. 7.

First, the CPU 16 obtains the acceleration signals in the up-and-down direction and the front-and-rear direction that are inputted from the acceleration sensor 2 via the acceleration signal input unit 12 (Step ST1). As mentioned above, the measurement intervals of the acceleration signals are, for example, 100 ms.

Subsequently, the CPU 16 determines whether the vehicle 7 stops or is traveling on the basis of the speed signals inputted from the vehicle speed sensor 3 via the speed signal input unit 13 (Step ST2). In the example of an operation shown in FIG. 7, the CPU 16 performs the optical axis control in the case where the vehicle 7 stops (Steps ST3 to ST9) and the optical axis control in the case where the vehicle 7 is traveling (Steps ST12 to ST16) in a switchable manner.

Note that in Step ST2 at which it is determined whether the vehicle stops or the vehicle is traveling, it is preferable that a filter having a delay time of, for example, about two seconds is provided in order not to erroneously determine noise in the speed signals as a traveling signal, or in order to determine a period from the time when the vehicle stops to the time when the vehicle body comes to a halt, as the traveling of the vehicle.

When the vehicle 7 stops (Step ST2 "YES"), the CPU 16 calculates the inclination angle of the vehicle 7 with respect to the horizontal direction (vehicle angle with respect to the horizontal direction) by using the acceleration signals obtained in Step ST1 (Step ST3). As a method of calculating the vehicle angle with respect to the horizontal direction by using the output of the acceleration sensor, which can detect gravitational acceleration, a known method can be used. Accordingly, the description thereof will be omitted.

The CPU 16 has a first-time flag, which indicates whether the vehicle angle with respect to the horizontal direction prior to change is stored in the storage 17, in order to determine whether the inclination of the vehicle 7 is varied due to the boarding or alighting of a person or by the unloading of baggage during stoppage of the vehicle.

The CPU 16 confirms whether the first-time flag has been set when the behavior of the vehicle 7 is changed from traveling to stoppage (Step ST4), and when the first-time flag has not been set yet (Step ST4 "YES"), that is, immediately after the stoppage of the vehicle, the CPU 16 sets the first-time flag (Step ST 5) and causes the storage 17 to store the vehicle angle with respect to the horizontal direction calculated in Step ST3 as a first-time vehicle angle with respect to the horizontal direction (Step ST6), and the process returns to Step ST1.

When the first-time flag has been set (Step ST4 "NO"), that is, in the second time onward after the stoppage of the vehicle, the CPU 16 reads out the first-time vehicle angle with respect to the horizontal direction from the storage 17, subtracts the vehicle angle with respect to the horizontal direction calculated in Step ST3 from the first-time vehicle angle to calculate a difference between the inclination angles (Step ST 7). When the difference between the inclination angles exists (Step ST8 "YES"), the inclination of the vehicle 7 is varied, and the optical axis is also varied due to the boarding or alighting of a person, or the unloading of baggage, and the like, and the CPU 16 calculates the vehicle angle after change by adding the difference between the inclination angles to the vehicle angle (Step ST 9). When the difference between the inclination angles does not exist (Step ST8 "NO"), the inclination angle of the vehicle 7 is not varied and the optical axis is not varied, either, and the process returns to Step ST1.

Step ST10 is a process for calculating an optical axis operation angle to cancel the varied angle in such a way that the optical axis returns to an initial position when the vehicle angle with respect to the horizontal direction is varied due to the boarding or alighting of a person, or the unloading of baggage, and the like.

In Step ST10, when the vehicle angle with respect to the horizontal direction is varied afterward (the second time onward after the stoppage of the vehicle) from the vehicle angle with respect to the horizontal direction immediately after the vehicle 7 stops (the first time after the stoppage of the vehicle), the CPU 16 calculates the optical axis operation angle which is used to cancel the difference between the varied inclination angles and return the optical axis to the initial position, and the CPU 16 uses the optical axis operation angle to control the optical axis.

Note that the first-time vehicle angle with respect to the horizontal direction after the stoppage of the vehicle is an angle corresponding to a vehicle angle during traveling without the boarding or alighting of a person, the unloading of baggage, or the like, and is suitable for a reference to observe change in inclination angles during the stoppage of the vehicle.

Regarding the optical axis control during the stoppage of the vehicle, for example, the vehicle 7 stops on a level road in advance, and the optical axis is set at an angle of depression of one present. The angle of depression of one present corresponds to an angle at which the optical axis is tilted by one meter with respect to 100 m in front of the vehicle. After the setting, it is possible to operate the optical axis in a direction in which the variation amount in the vehicle angles is cancelled, in order to return the optical axes of the headlights 5L, 5R to the initial positions in response to the difference between the vehicle angles, which is varied due to the boarding or alighting of a person, or the unloading of baggage, and the like.

As an example, the optical axis operation angle is obtained on the basis of an optical axis correction angle stored in advance in the storage 17, a vehicle angle reference value stored in advance in the storage 17, and the vehicle angle calculated in Step ST8. By subtracting the vehicle angle from the vehicle angle reference value, a variation amount of the vehicle angle is canceled, and by adding a total value of the optical axis correction angle and the vehicle angle reference value to the value obtained by subtracting the vehicle angle from the vehicle angle reference value, the optical axis returns to the initial position.

The optical axis correction angle and the vehicle angle reference value will be explained later.

The CPU 16 generates an optical axis operation signals from the optical axis operation angle calculated in Step ST 10, and outputs them to the optical axis operation devices 6L, 6R via the optical axis operation signal output unit 18 (Step ST 11). The optical axis operation devices 6L, 6R operate the optical axes of the headlight 5L, 5R in accordance with the optical axis operation signals transmitted from the optical axis operation signal output unit 18.

In contrast, when the behavior of the vehicle 7 changes from the stoppage to the traveling (Step ST2 "NO"), the CPU 16 resets the first-time flag (Step ST12). Subsequently, the CPU 16 determines whether the wheels are stopped on the basis of the speed signals inputted from the vehicle speed sensor 3 via the speed signal input unit 13 (Step ST 13).

When the wheels stop (Step ST13 "YES"), the CPU 16 detects the center of the vibration amplitude in the up-and-down direction of the vehicle body by using the acceleration signals in a period in which the vehicle travels, stops, and leads to a stationary state, and the CPU 16 calculates the vehicle angle θ in accordance with the above-mentioned equation (1) by using the acceleration signals in the up-and-down direction and in the front-and-rear direction measured at the above-mentioned two measurement time points kn, kn+1, which are two time points in the vicinity of the time when the vehicle body passes through the center of the vibration amplitude or two time points with the center of the vibration amplitude sandwiched therebetween, one of which is a time point before the vehicle body passes through the center of the vibration amplitude and the other of which is a time point after the vehicle body passes through the center of the vibration amplitude (Step ST14). In this case, since the measurement intervals of the acceleration signals are 100 ms, a time interval between kn and kn+1 is 100 ms.

Note that there is a case in which it is impossible to detect the center of the vibration amplitude in the up-and-down direction when the vehicle 7 gently stops in such a way that change in the inclination angle of the vehicle body is small. In this case, it is impossible to calculate the vehicle angle θ. Thus, when the CPU 16 cannot calculate the vehicle angle θ (Step ST15 "NO"), the process returns to Step ST1. In contrast, when the CPU 16 can calculate the vehicle angle θ (Step ST15 "YES"), the CPU 16 updates the vehicle angle to a new value of the vehicle angle θ calculated in Step ST 14 (Step ST 16).

After Step ST 16, the CPU 16 calculates the optical axis operation angle in Step ST10, generates the optical axis operation signals in Step ST11, and outputs them to the optical axis operation devices 6L, 6R via the optical axis operation signal output unit 18.

In this way, it is possible to calculate the vehicle angle by using the acceleration in a period in which the vehicle travels, stops, and leads to a stationary state, thereby obtaining the vehicle angle equivalent to a stationary state without being affected from the gradient of the road on which the vehicle 7 travels and the inclination (pitching) of the vehicle 7 which varies due to the acceleration or deceleration.

Further, since the variation amount of the acceleration in 100 ms is used to calculate the vehicle angle, there is no influence of the offset included in the output of the acceleration sensor 2, and there is no problem even when the offset is varied over time. In contrast, since the optical axis control using the vehicle angle with respect to the horizontal direction when the vehicle 7 stops (Steps ST3 to ST9) is a method in which change in the vehicle angle is endlessly accumulated, there is a possibility that errors are accumulated. Therefore, in the optical axis control using the vehicle angle with respect to the horizontal direction, there is a possibility that the optical axis is gradually shifted. However, by combining the optical axis control (Steps ST12 to ST16) using the vehicle angle calculated on the basis of the acceleration in a period in which the vehicle travels, stops, and leads to a stationary state, the accumulated errors can be removed, and the optical axis of the headlight can be maintained at the correct angle over a long period of time.

Figure 8:
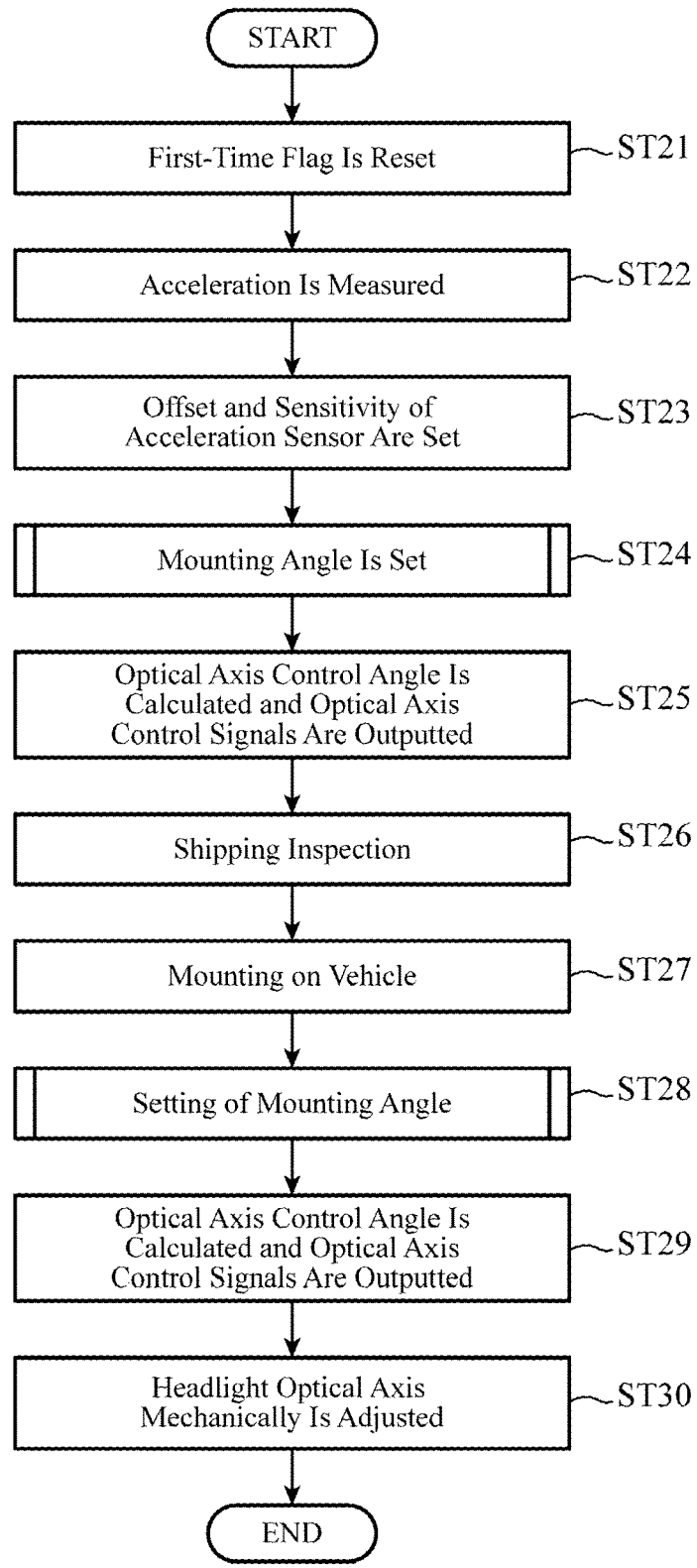
FIG. 8 is a flowchart for illustrating a method of performing the initial setting of the headlight optical axis control apparatus according to Embodiment 1.

Next, a method of performing the initial setting of the headlight optical axis control apparatus 10 will be described with reference to a flowchart in FIG. 8. Herein, as shown in FIG. 2B or FIG. 2C, a configuration in which the acceleration sensor 2 is incorporated into the headlight optical axis control apparatus 10 will be exemplified.

In a manufacturing plant, the first-time flag of the CPU 16 is reset after the completion of the headlight optical axis control apparatus 10 (Step ST21). An operator tilts the headlight optical axis control apparatus 10 into which the acceleration sensor 2 is incorporated at least in three directions. The acceleration sensor 2 measures the acceleration in the up-and-down direction and the front-and-rear direction at each time when the headlight optical axis control apparatus 10 is tilted, and outputs the acceleration signals (Step ST22). The CPU 16 estimates the offset and sensitivity of the acceleration sensor 2 based on the inputted acceleration signals (Step ST 23).

Figure 9A:
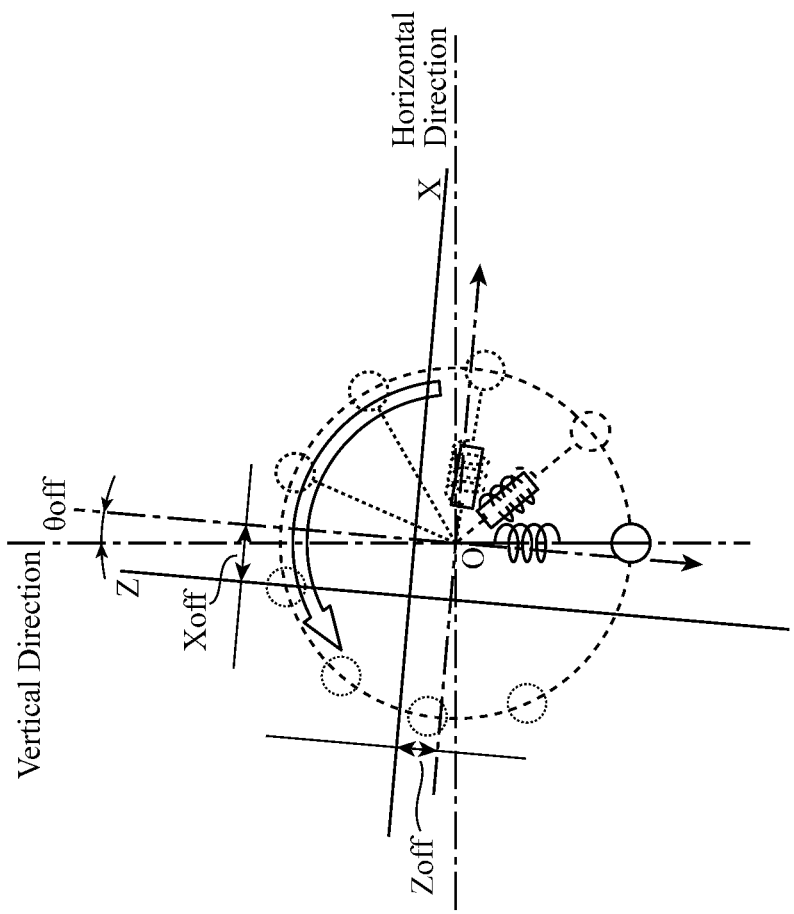
FIGS. 9A and 9B are diagrams to describe the method of performing the initial setting of the headlight optical axis control apparatus according to Embodiment 1.
Figure 9B:
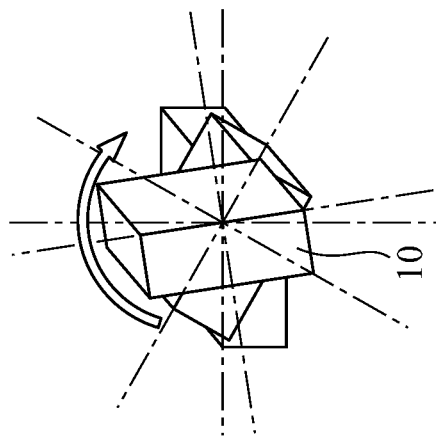

FIG. 9A is a diagram for explaining the acceleration measurement system and the weight viewed from the vertical direction and the horizontal direction in the initial setting. An intersection of the X-axis and the Z-axis is an origin of the acceleration sensor 2, and an intersection of the vertical axis and the horizontal axis is an origin O in terms of measurement viewed from the vehicle 7. In Step ST 22, as shown in FIG. 9B, when the headlight optical axis control apparatus 10 into which the acceleration sensor 2 is incorporated is rotated, the acceleration measured by the acceleration sensor 2 as shown in FIG. 9A, that is, an origin O, which is the center of a circle drawn by a weight suspended from a spring, corresponds to the offset to the acceleration measurement system, and a size of the circle corresponds to the sensitivity of the acceleration measurement system. In this example, an offset in the X-axis direction is represented as Xoff, and an offset in the Z-axis direction is represented as Zoff. θoff indicates a deviation of the mounting angle of the acceleration sensor 2.

Subsequently, the operator fixes the headlight optical axis control apparatus 10 on a level surface, and sets the mounting angle of the acceleration sensor 2 with respect to the headlight optical axis control apparatus 10 (Step ST24). When the headlight optical axis control apparatus 10 receives a setting signal from the outside, the storage 17 stores the offset and the sensitivity of the acceleration sensor 2 obtained in Step ST 23 and the set value of the mounting angle determined in Step ST24.

Note that the setting signal, which includes the above-mentioned various setting values, may be substituted by, for example, by inputting a specific input pattern to the vehicle information input unit 14, in addition to a setting signal that is used to communicate with an external device. Note that the specific input pattern is combination of a kind of codes, for example, setting a selection lever of transmission to "R", setting the lighting switch to "on", and repeating a passing switch "on" three times. Of course, the combination of the signals for the input pattern is not limited to the above-mentioned example.

Figure 10:
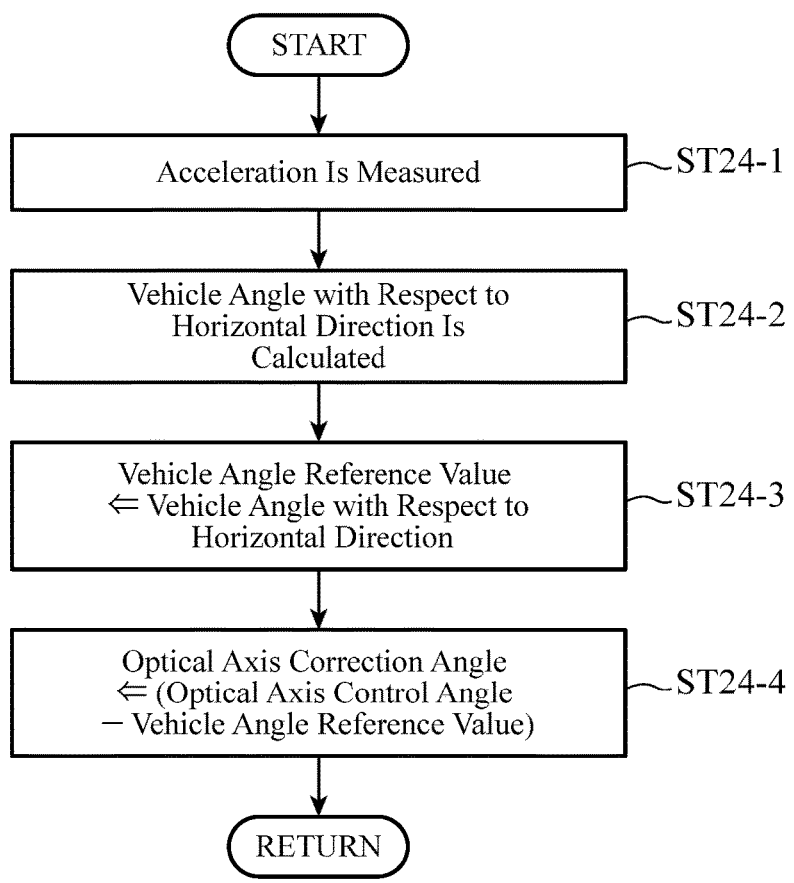
FIG. 10 is a flowchart for illustrating a method of setting a mounting angle of the headlight optical axis control apparatus according to Embodiment 1.

FIG. 10 illustrates a method of setting the mounting angle. While the headlight optical axis control apparatus 10 is fixed on the level surface, the acceleration sensor 2 measures the acceleration (Step ST24-1), the CPU 16 calculates the vehicle angle with respect to the horizontal direction (Step ST24-2), and stores the calculated vehicle angle with respect to the horizontal direction as the vehicle angle reference value in the storage 17 (Step ST24-3). Finally, the CPU 16 calculates the optical axis correction angle by subtracting the vehicle angle reference value from the optical axis operation angle (e.g., 0 degrees), and stores the optical axis correction angle in the storage 17 (Step ST24-4). Note that when the mounting angle is set, the acceleration sensor 2 is fixed on the level surface, and accordingly, a central value (=0 degrees) is used as the optical axis operation angle.

An equation "the optical axis correction angle=(the optical axis operation angle at time of setting the mounting angle−the vehicle angle reference value)" in Step ST24-4 can be transformed to an equation "the optical axis operation angle at the time of setting the mounting angle=(the optical axis correction angle+the vehicle angle reference value)". The optical axis correction angle and the vehicle angle reference value are stored in the storage 17 and used when the steps in the flowchart in FIG. 7 are executed.

Subsequently, the CPU 16 generates the optical axis operation signals on the basis of the optical axis operation angle at the time of setting the mounting angle and outputs them (Step ST 25). The operator verifies whether the optical axis operation signals are correct values (Step ST26).

Processes of Steps ST27 to ST30 are carried out in the vehicle manufacturing plant or a vehicle maintenance shop. The operator mounts the headlight optical axis control apparatus 10 on the vehicle 7 (Step ST 27), and sets the mounting angle of the acceleration sensor 2 with respect to the vehicle 7 in a state in which the vehicle 7 stops on a level road surface (Step ST28). Processes of Steps ST 28, ST 29 are the same as Steps ST 24, ST 25.

In Step ST28, the setting of the mounting angle is performed using the same procedures as indicated in Steps ST24-1 to ST24-4 in FIG. 10. The operator stops the vehicle 7 on the level road surface, causes the headlight optical axis control apparatus 10 to recognize the vehicle angle with respect to the horizontal direction, i.e., the deviation θoff of the mounting angle of the acceleration sensor 2 shown in FIG. 9A, and causes the headlight optical axis control apparatus 10 to correct the deviation of the mounting angle of the acceleration sensor 2 with respect to the vehicle 7.

After the above-mentioned electrical setting of the headlight optical axis control apparatus 10 is finished, the operator sets the optical axes of the headlights 5L, 5R to the initial positions by mechanically adjusting the optical axes of the headlights 5L, 5R with a wrench or driver (Step ST30). Thereby, when the optical axis operation angle (=the optical axis correction angle+the vehicle angle reference value) is 0 degrees, the axes of the headlights 5L, 5R are positioned at the initial positions.

Next, specific examples of a method for detecting the timing at which the attitude of the vehicle body is identical to a stationary state in a period in which the travelling vehicle stops and falls into a stationary state, that is, the timing at which the vehicle body passes through the center of the vibration amplitude in the up-and-down direction while the vehicle body vibrates after the stoppage of the wheels.

For example, the CPU 16 detects timing at which the acceleration signal in the up-and-down direction measured by the acceleration sensor 2 becomes zero, and determines that the detected timing is the timing at which the vehicle body passes through the center of the vibration amplitude in the up-and-down direction.

Note that the timing at which the acceleration signal in the up-and-down direction becomes zero means that timing at which the acceleration due to the vibration becomes zero. Therefore, when the gravitational acceleration is superimposed on the acceleration signal measured by the acceleration sensor 2, it is necessary to perform a process to subtract the gravitational acceleration from the acceleration signal.

Alternatively, the CPU 16 may calculate jerk (JERK) by differentiating the acceleration signals in the up-and-down direction measured by the acceleration sensor 2, detect timing at which the jerk becomes a local maximum or a local minimum, and determine that the detected timing is the timing at which the vehicle body passes through the center of the vibration amplitude in the up-and-down direction. In FIG. 6, the jerk becomes the local maximum at timing (indicated by the asterisk) at which the vehicle body passes through the center of the vibration amplitude when the vehicle body vibrates from below to above. In contrast, the jerk becomes the local minimum at timing at which the vehicle body passes through the center of the vibration amplitude when the vehicle body vibrates from above to below.

A process for calculating the difference of the acceleration signals between two time points in calculating the vehicle angle θ is equivalent to the process of differentiation to calculate the jerk. Moreover, a process of subtracting the gravitational acceleration as described above is not required. Accordingly, the process of detecting the local maximum value or local minimum value of the jerk can be relatively easily implemented.

Alternatively, the CPU 16 may calculate moving velocity of the vehicle body, which vibrates up and down, by integrating the acceleration signals in the up-and-down direction measured by the acceleration sensor 2, detect timing at which the moving velocity becomes a local maximum or a local minimum, and determine that the detected timing is the timing at which the vehicle body passes through the center of the vibration amplitude in the up-and-down direction.

Alternatively, the CPU 16 may calculate a moving amount of the vehicle body, which oscillates vertically, by further integrating the above-mentioned moving velocity of the vehicle body, and detect timing at which the moving amount is positioned in the middle between a local maximum value and a local minimum value of the vertical moving amount, that is, the timing at which the vehicle body passes through the center of the amplitude in the up-and-down direction. Alternatively, the CPU 16 may calculate a mean value of the moving amount, and determine that timing at which the moving amount reaches the calculated mean value is the timing at which the vehicle body passes through the center of the amplitude in the up-and-down direction.

In the above-mentioned examples, it is configured that the timing at which the vehicle body passes through the center of the amplitude in the up-and-down direction is detected on the basis of the acceleration signals in the up-and-down direction. Alternatively, it is possible to estimate the timing at which the vehicle body passes through the center of the amplitude in the up-and-down direction on the basis of the acceleration signals in the front-and-rear direction.

In the example shown in FIG. 6, since the vibration of the vehicle body in the up-and-down direction and the vibration of the vehicle body in the front-and-rear direction after the stop of the wheels are approximately synchronized, the timing at which the vehicle body passes through the center of the vibration in the up-and-down direction approximately coincides with timing at which a moving direction of the vehicle body in the front-and-rear direction is inverted. In the example shown in FIG. 6, the center of the amplitude in the up-and-down direction indicated by the asterisk and a point of the amplitude in the front-and-rear direction indicated by the triangle appear at the same timing.

Thus, the CPU 16 can detect, for example, the timing at which the acceleration signal in the front-and-rear direction measured by the acceleration sensor 2 becomes a local maximum or a local minimum, and estimate that the detected timing is the timing at which the vehicle body passes through the center of the amplitude in the up-and-down direction.

Alternatively, the CPU 16 may detect timing at which jerk, which is obtained by differentiating the acceleration signals in the front-and-rear direction measured by the acceleration sensor 2, becomes zero, and estimate that the detected timing is the timing at which the vehicle body passes through the center of the amplitude in the up-and-down direction.

Alternatively, the CPU 16 may calculate moving velocity of the vehicle body, which vibrates back and forth, by integrating the acceleration signals in the front-and-rear direction measured by the acceleration sensor 2, detect timing at which the moving velocity becomes zero, and estimate that the detected timing is the timing at which the vehicle body passes through the center of the amplitude in the up-and-down direction.

Alternatively, the CPU 16 may calculate a moving amount of the vehicle body, which vibrates back and forth, by further integrating the above-mentioned moving velocity of the vehicle body in the front-and-rear direction, and detect timing at which the moving amount becomes a local maximum or a local minimum, and estimate that the detected timing is the timing at which the vehicle body passes through the center of the amplitude in the up-and-down direction.

As mentioned above, according to Embodiment 1, the control unit 15 calculates the vehicle angle θ from a ratio of a difference between the acceleration signals in the up-and-down direction measured at two time points to a difference between the acceleration signals in the front-and-rear direction measured at the two time points, the two time points being selected from a period ranging from a time immediately before attitude of a vehicle body is identical to a stationary state to a time immediately after the attitude of the vehicle body is identical to the stationary state, from a time when the travelling vehicle 7 stops to a time when the vehicle body comes to a halt. Therefore, it is possible to obtain the vehicle angle θ with high accuracy in which the error of the inclination angle caused by the acceleration or deceleration of the vehicle 7 is not included. In addition, since the variation amount of the acceleration is used, it is possible to reduce the influence of the offset potentially included in the output of the acceleration sensor 2 and the influence of the offset variation over time. Thus, it is possible to obtain a stable vehicle angle θ over a long period of time.

Note that in Embodiment 1, the behavior of the vehicle body during the period from the time when the travelling vehicle 7 stops to the time when the vehicle body comes to a halt is used to calculate the vehicle angle θ. In theory, when the vehicle 7 starts moving, similar behavior of the vehicle body occurs. However, acceleration when the vehicle 7 starts moving is smaller than the acceleration when the vehicle comes to a stop. Thus, it is more difficult to detect a small change of the vehicle body when the vehicle starts moving than to detect the change of the vehicle body when the vehicle stops as long as an actual acceleration sensor at present is used. Therefore, in the present situation, it is preferable that the behavior of the vehicle body at the time when the vehicle 7 stops should be used to calculate the vehicle angle θ.

Further, according to embodiment 1, as shown in FIG. 2B, when the acceleration sensor 2 is integrated with the headlight optical axis control apparatus 10, it is possible to omit electrical wiring. Thus, it is possible to provide the headlight optical axis control apparatus 10 having a simple structure.

Further, according to Embodiment 1, as shown in FIG. 2C, the headlight optical axis control apparatus 10 is integrated with vehicle-mounted electrical equipment 8 having functions other than those of the optical axis control, and the headlight optical axis control apparatus 10 is not independently provided, so that a system configuration mounted on the vehicle 7 is simplified.

In this disclosure, it is to be understood that various changes can be made in any component in embodiments, and any component(s) in the embodiments can be omitted within the scope of the invention.

INDUSTRIAL APPLICABILITY

The headlight optical axis control apparatus according to the present invention can control the headlight optical axis with high accuracy while using the acceleration sensor, so that the headlight optical axis control apparatus is suitable for using as an optical axis control apparatus for the headlight having a bright light source such as a LED.

REFERENCE SIGNS LIST 1 vehicle-mounted battery, 2 acceleration sensor, 3 vehicle speed sensor, 4 switch, 5L left side headlight, 5R right side headlight, 6L, 6R optical axis operation device, 7 vehicle, 8 vehicle-mounted electrical equipment, 10 headlight optical axis control apparatus, 11 power supply unit, 12 acceleration signal input unit, 13 speed signal input unit, 14 vehicle information input unit, 15 control unit, 16 CPU, 17 storage, 18 optical axis operation signal output unit.

The invention claimed is:

1. A headlight optical axis control apparatus comprising a controller which calculates an inclination angle of a vehicle with respect to a road surface on a basis of acceleration signals in an up-and-down direction and in a front-and-rear direction, the acceleration signals being measured by an acceleration sensor mounted on the vehicle and which generates control signals to operate a headlight optical axis,
wherein the controller calculates the inclination angle of the vehicle with respect to the road surface from a ratio of a difference between the acceleration signals in the up-and-down direction measured at two time points to a difference between the acceleration signals in the front-and-rear direction measured at the two time points, the two time points being selected from a period ranging from a time immediately before attitude of a vehicle body is identical to a stationary state to a time immediately after the attitude of the vehicle body is identical to the stationary state, from a time when the travelling vehicle stops to a time when the vehicle body comes to a halt.

2. The headlight optical axis control apparatus according to claim 1, wherein the acceleration signals measured at the two time points from the time when the travelling vehicle stops to the time when the vehicle body comes to a halt are acceleration signals caused by vibration of the vehicle body from a time when wheels of the vehicle stop to the time when the vehicle body comes to a halt.

3. The headlight optical axis control apparatus according to claim 2, wherein the time when the attitude of the vehicle body is identical to the stationary state corresponds to a time when the vehicle body passes through a center of amplitude in the up-and-down direction during a period in which the vehicle body vibrates after the wheels of the vehicle stop.

4. The headlight optical axis control apparatus according to claim 3, wherein the time when the vehicle body passes through the center of the amplitude in the up-and-down direction during the period in which the vehicle body vibrates after the wheels of the vehicle stop corresponds to
- a time when the acceleration signal in the up-and-down direction is at zero,
- a time when jerk that is obtained by differentiating the acceleration signal in the up-and-down direction reaches a local maximum or a local minimum
- a time when moving velocity that is obtained by integrating the acceleration signal in the up-and-down direction reaches a local maximum or a local minimum, or
- a time when a moving amount that is obtained by integrating the moving velocity is a central value between a local maximum value of the moving amount and a local minimum value of the moving amount or a mean value of the moving amount.

5. The headlight optical axis control apparatus according to claim 1, wherein
the acceleration sensor is integrally constituted.

6. The headlight optical axis control apparatus according to claim 1, wherein vehicle-mounted electrical equipment mounted on the vehicle is integrally constituted.

* * * * *